United States Patent
Park

(10) Patent No.: US 12,235,203 B2
(45) Date of Patent: Feb. 25, 2025

(54) LIGHTING SYSTEM FOR ANALYZING PELLET AND FOREIGN MATTER SORTING APPARATUS COMPRISING SAME

(71) Applicant: SCIGENTEC CO., LTD., Seoul (KR)

(72) Inventor: Yong Jae Park, Seoul (KR)

(73) Assignee: SCIGENTEC CO., LTD., Seoul (KR)

( * ) Notice: Subject to any disclaimer, the term of this patent is extended or adjusted under 35 U.S.C. 154(b) by 0 days.

(21) Appl. No.: 18/580,431

(22) PCT Filed: Jul. 18, 2022

(86) PCT No.: PCT/KR2022/010454
§ 371 (c)(1),
(2) Date: Jan. 18, 2024

(87) PCT Pub. No.: WO2023/003302
PCT Pub. Date: Jan. 26, 2023

(65) Prior Publication Data
US 2024/0344966 A1 Oct. 17, 2024

(30) Foreign Application Priority Data
Jul. 19, 2021 (KR) .......................... 10-2021-0094257

(51) Int. Cl.
*G01N 15/149* (2024.01)
*B07C 5/342* (2006.01)
*G01N 15/1434* (2024.01)

(52) U.S. Cl.
CPC ......... *G01N 15/149* (2024.01); *B07C 5/3425* (2013.01); *G01N 15/1434* (2013.01)

(58) Field of Classification Search
CPC . G01N 15/149; G01N 15/1434; B07C 5/3425
See application file for complete search history.

(56) References Cited

U.S. PATENT DOCUMENTS

2010/0108887 A1* 5/2010 Ogawa ............... G01N 21/3563
250/339.08
2018/0250904 A1* 9/2018 Gower .................. B30B 11/221

FOREIGN PATENT DOCUMENTS

JP 2003-158611 A 5/2003
JP 2006-26469 A 2/2006
(Continued)

OTHER PUBLICATIONS

International Search Report No. PCT/KR2022/010454 Issued on Sep. 21, 2022 (4 Pages in Korean).

*Primary Examiner* — Anne M Hines
(74) *Attorney, Agent, or Firm* — NSIP Law

(57) ABSTRACT

The present invention relates to a lighting system for analyzing pellet and a foreign matter sorting apparatus comprising same. The lighting system for analyzing pellet comprises: a casing (100) which has an inner space and a through-hole (110) formed in the upper surface; an upper lighting assembly (200) which includes a plurality of first light sources (210) each irradiating first illumination light, and a first light source holder (220) which fixes the first light sources (210); and a lower lighting assembly (300) comprising a plurality of second light sources (310) each irradiating second illumination light, and a second light source holder (320) which fixes the plurality of second light sources (310), wherein the lower lighting assembly (300) is arranged on the inner lower portion of the casing (100) and irradiates the second illumination light toward the lower and side portions of the objects to be sorted (P).

10 Claims, 6 Drawing Sheets

(56) References Cited

FOREIGN PATENT DOCUMENTS

| KR | 10-1891515 B1 | 8/2018 |
| KR | 10-2019-0010589 A | 1/2019 |
| KR | 10-2009757 B1 | 8/2019 |
| KR | 10-2334707 B1 | 12/2021 |

* cited by examiner

[FIG. 1]
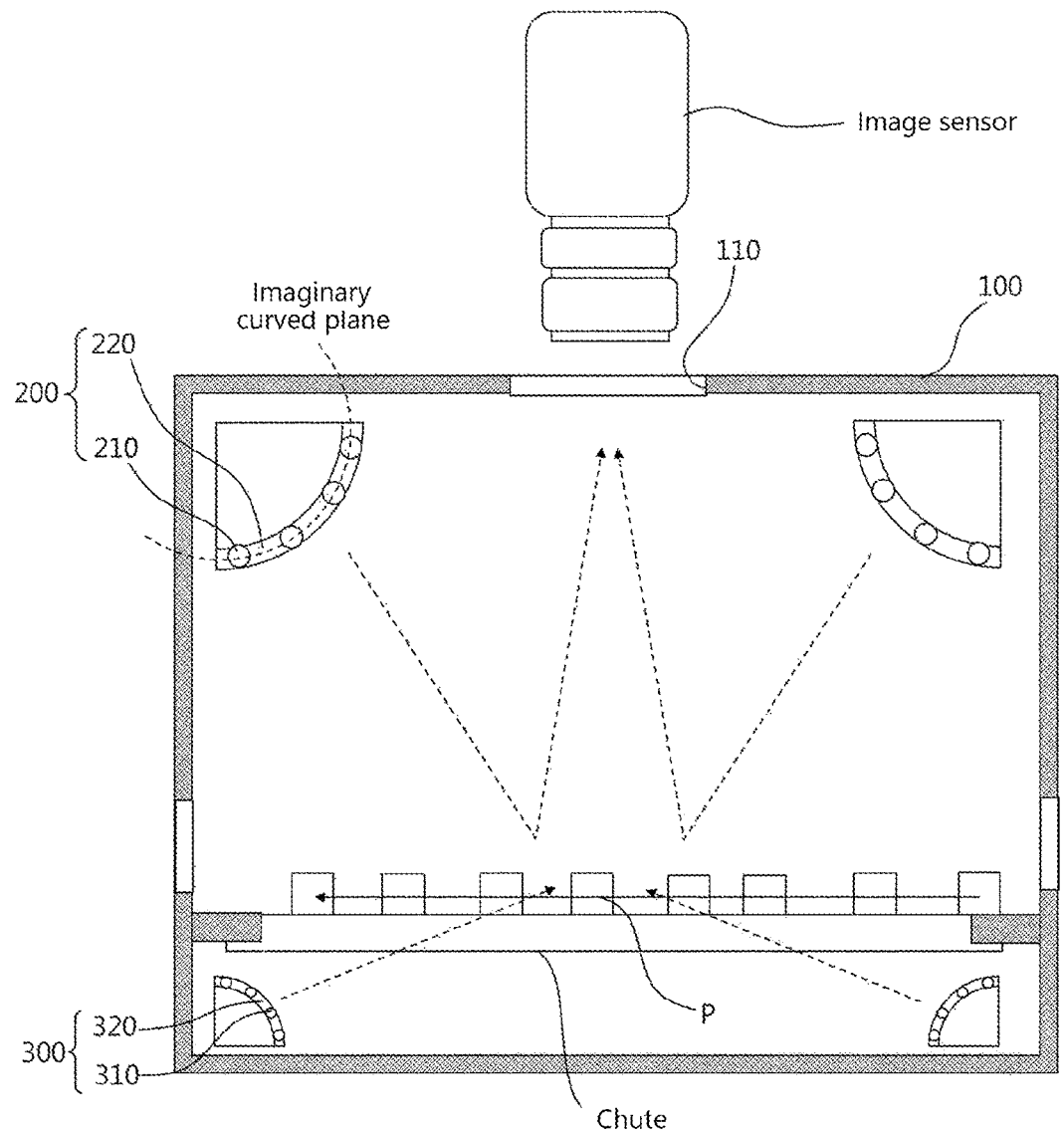

[Fig. 2]
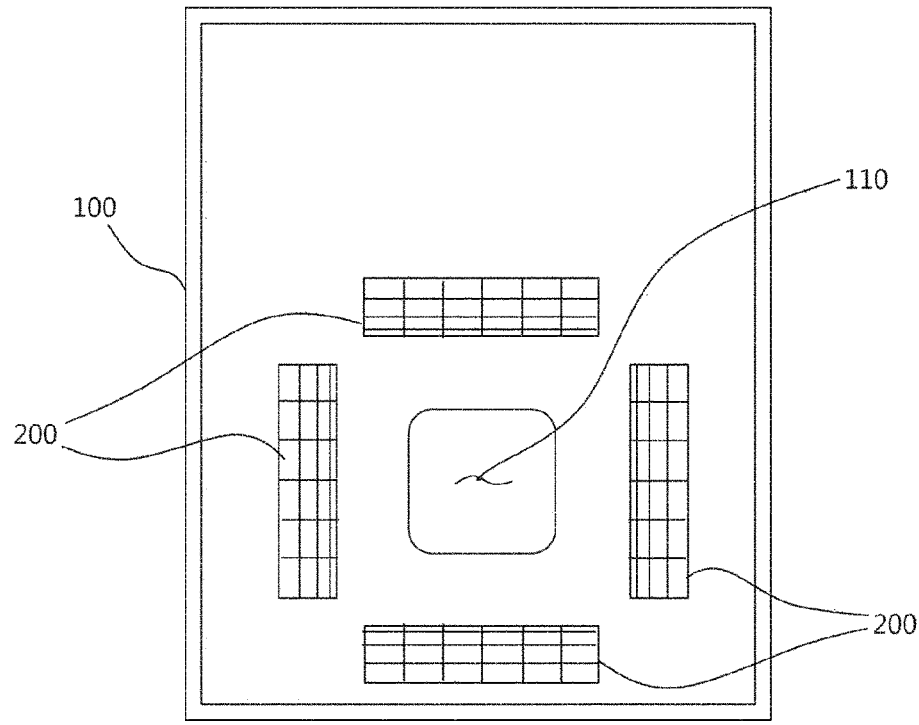
[Fig. 3]
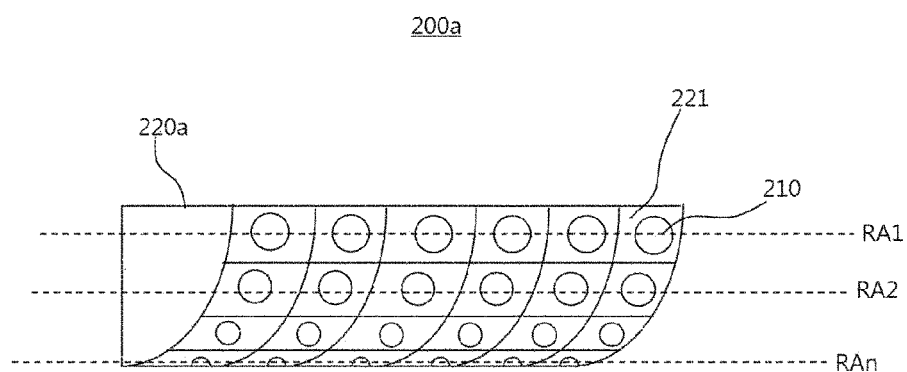

[Fig. 4]
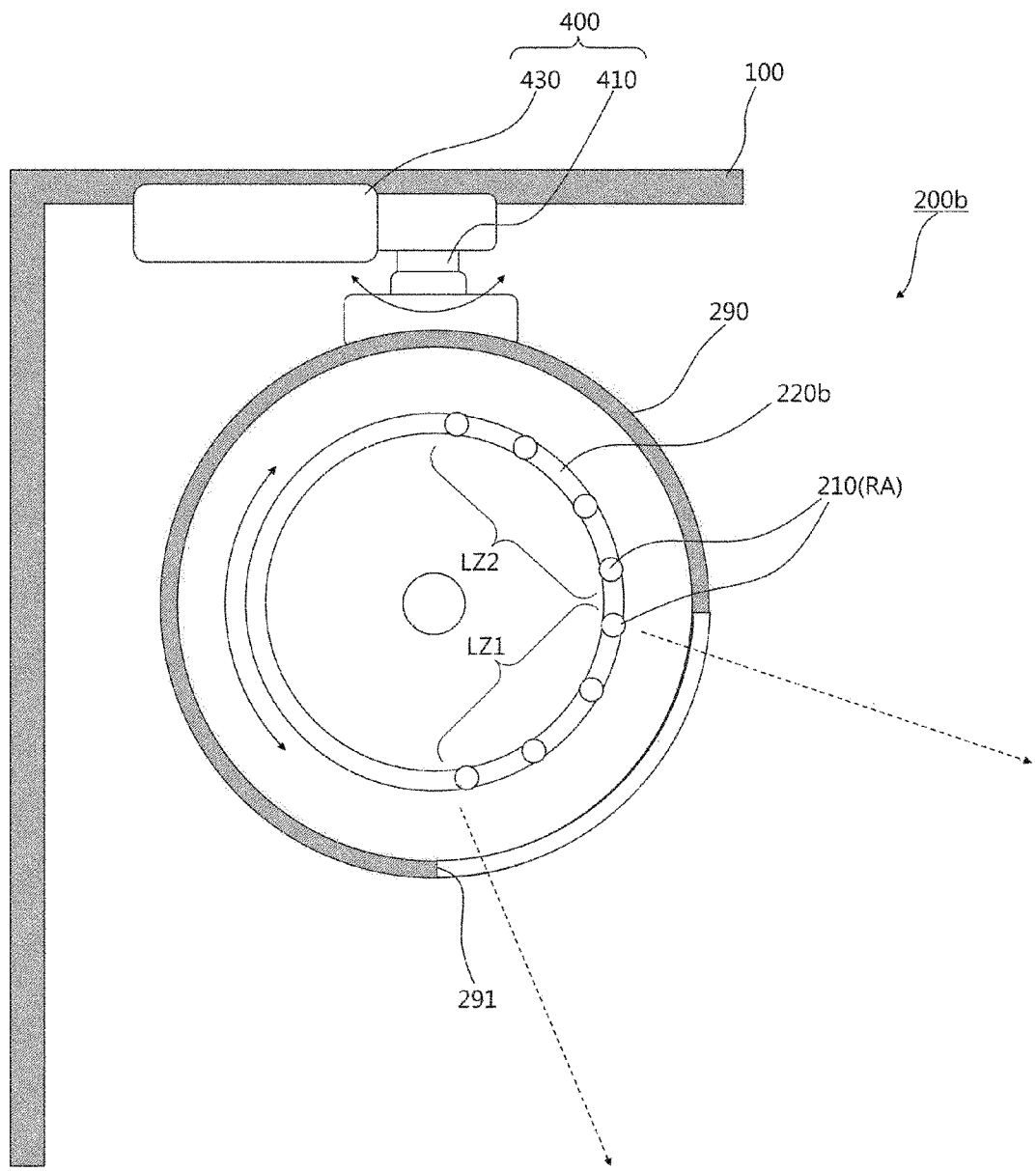

[Fig. 5]
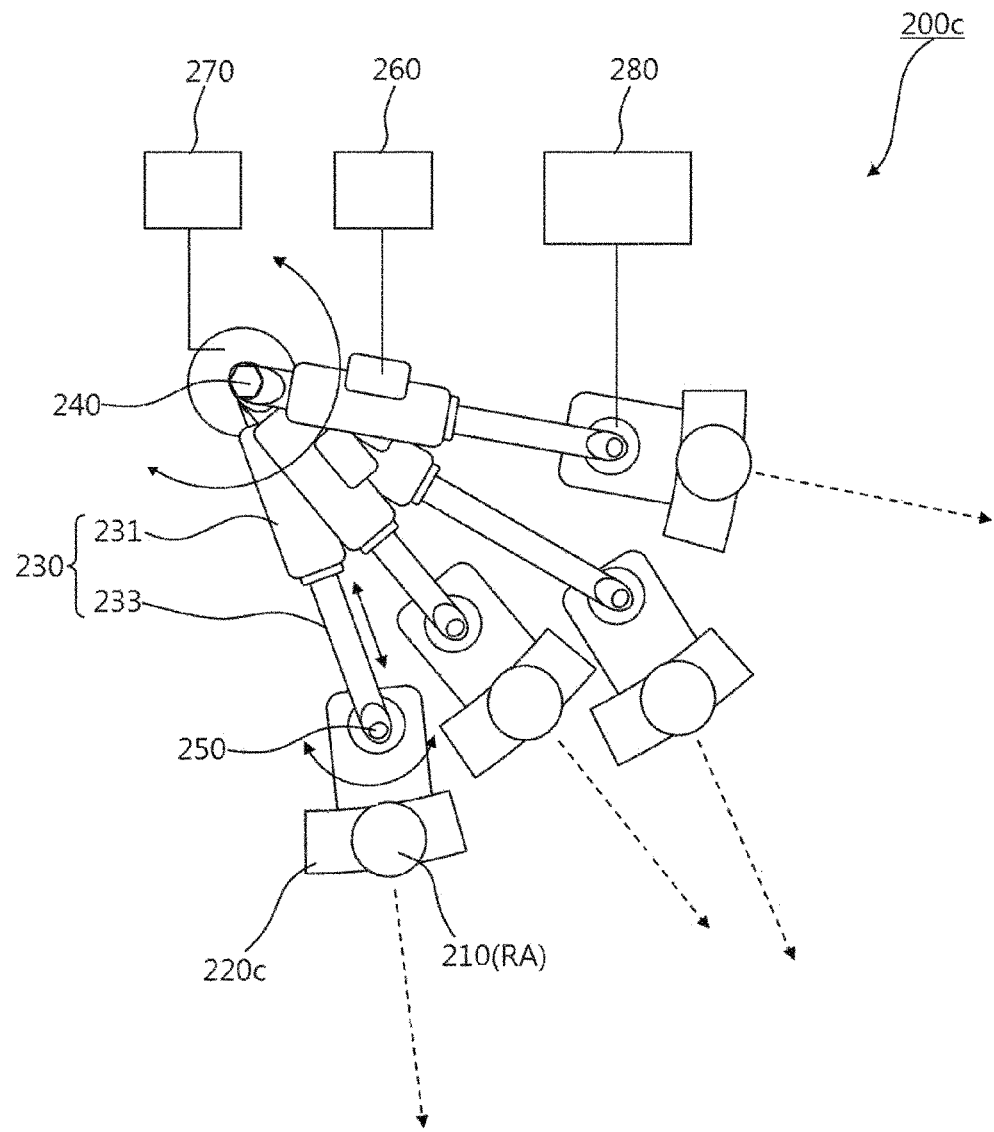

[Fig. 6]
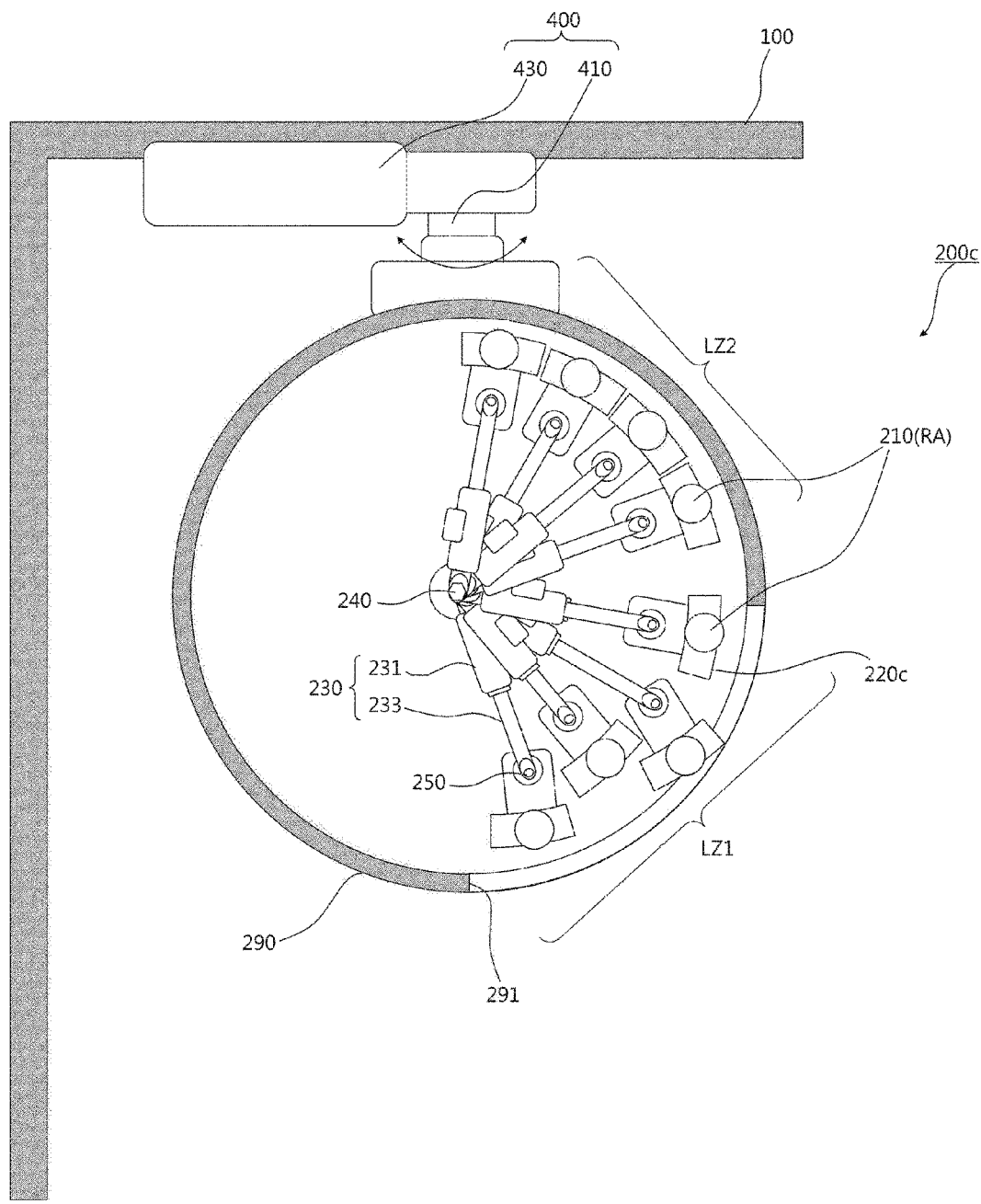

[Fig. 7]
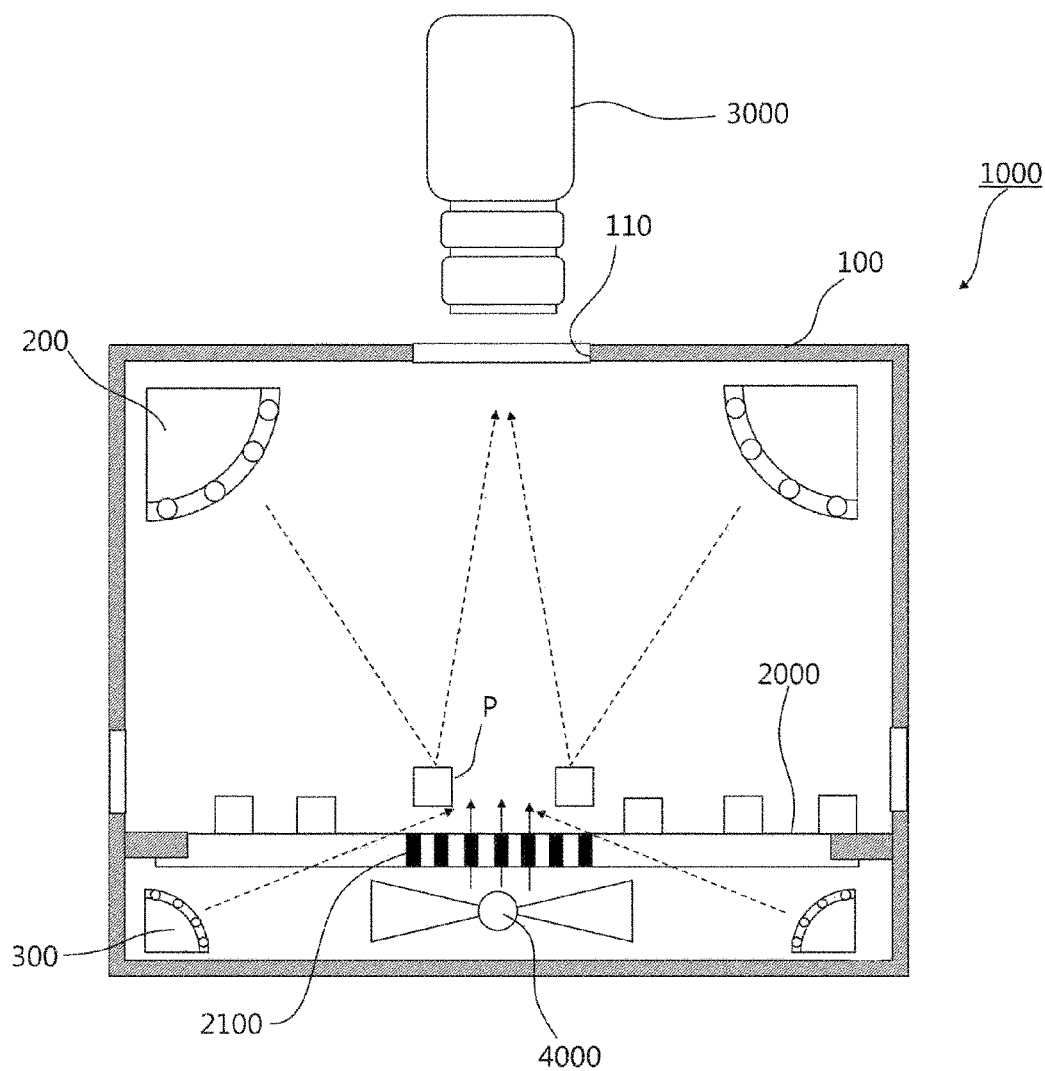

LIGHTING SYSTEM FOR ANALYZING PELLET AND FOREIGN MATTER SORTING APPARATUS COMPRISING SAME

CROSS REFERENCE TO RELATED APPLICATIONS

This application is a U.S. National Stage Application of International Application No. PCT/KR2022/010454, filed on Jul. 18, 2022, which claims the benefit under 35 USC 119 (a) and 365 (*b*) of Korean Patent Application No. 10-2021-0094257, filed on Jul. 19, 2021 in the Korean Intellectual Property Office, the entire disclosure of which is incorporated herein by reference for all purposes.

TECHNICAL FIELD

The present invention relates to a lighting system for pellet analysis and an apparatus for foreign matter sorting including the same. More specifically, the present invention relates to a lighting system designed to suppress the appearance of shadows during analysis of transparent/opaque pellets and an apparatus for foreign matter sorting including the lighting system.

BACKGROUND ART

Synthetic resins are representative petrochemicals and their solid particles, called pellets, are widely used in various fields such as films, pipes, and automotive interior materials. Since pellets are raw materials significantly affecting the quality of final products, it is very important to control the quality of pellets and manage impurities in pellets. Particularly, foreign particles of other colors such as black, yellow, and red and foreign particles of other shapes such as long, twin, and snakeskin shapes are unexpectedly generated during pellet production. Such foreign particles need to be sorted out.

For example, Patent Document 1 discloses an apparatus for selectively screening standardized and normalized pellets that can be used as raw materials for the manufacture of synthetic resin molded products, where precision is required, by injection molding. The apparatus is designed such that pellets are produced from an extruder and supplied to a hopper through a discharge line and a net is mounted under the hopper to selectively screen standardized and normalized ones of the pellets. However, the screening method using a net is insufficient in precisely screening pellets due to its dependence on the shape and size of the net and cannot be used to sort out pellets containing other colors such as black spots or sort transparent pellets, opaque pellets, and colored pellets. Thus, an additional process is required to measure pellets, making the screening method unsuitable for precisely sorting various pellets.

In an attempt to solve these problems, Patent Document 2 discloses an apparatus for foreign matter sorting was developed in which pellets are imaged during transport and the images are analyzed. The apparatus includes a camera and a lighting system as means for pellet imaging. However, the lighting system has a problem in that very various forms of shadows appear due to interactions (including reflection, absorption, and refraction) between pellets and illumination light, making it impossible to analyze and distinguish actual foreign particles and normal pellets only with images.

Thus, there is an urgent need for a solution to the problems of conventional lighting systems for pellet analysis.

PRIOR ART DOCUMENTS (Patent Document 1) KR 20-0317316 Y1
(Patent Document 2) KR 10-1891515 B1

DETAILED DESCRIPTION OF THE INVENTION

Problems to be Solved by the Invention

The present invention has been made in an effort to solve the problems of the prior art, and one aspect of the present invention is to provide a lighting system for pellet analysis in which a plurality of illumination devices are arrayed such that the arrays are convexly rounded toward objects to be sorted including a plurality of pellets and moving in one direction and irradiate illumination light in all directions, including upward, downward, left, and right directions, and an apparatus for foreign matter sorting.

A further aspect of the present invention is to provide a lighting system for pellet analysis in which a plurality of illumination devices partly or entirely have different light intensities and irradiate light in controlled directions, and an apparatus for foreign matter sorting.

Means for Solving the Problems

A lighting system for pellet analysis according to an embodiment of the present invention includes: a casing having an internal space, a through-hole formed at an upper side thereof, and inner upper and lower portions between which objects to be sorted including a plurality of pellets move; upper illumination assemblies, each of which includes a plurality of first illumination sources irradiating first illumination light and a first light source holder fixing the first illumination sources onto an imaginary curved plane convexly rounded toward the objects in a circular arc direction corresponding to the vertical direction with respect to the casing such that rows of light source arrays, in which some of the plurality of first illumination sources are arrayed along the lengthwise direction of the imaginary curved plane, are arrayed parallel to the circular arc direction of the imaginary curved plane, arranged in the inner upper portion of the casing to irradiate the first illumination light toward upper and side portions of the objects; and lower illumination assemblies, each of which includes a plurality of second illumination sources irradiating second illumination light and a second light source holder fixing the plurality of second illumination sources, arranged in the inner lower portion of the casing to irradiate the second illumination light toward lower and side portions of the objects.

According to an exemplary embodiment of the present invention, the upper illumination assemblies may be arranged at the sides of an imaginary rectangular ring centered on the through-hole and the lower illumination assemblies may be arranged to face the upper illumination assemblies diagonally.

According to an exemplary embodiment of the present invention, each of the first light source holders may be disposed in a shape corresponding to the imaginary curved plane and may have an illumination mounting plane to which the plurality of first illumination sources are fixed.

According to an exemplary embodiment of the present invention, each of the first light source holders may be disposed in a cylindrical shape whose outer circumference corresponds to the imaginary curved plane and may rotate along the circular arc direction, and the plurality of first illumination sources may be fixed to the outer circumference.

According to an exemplary embodiment of the present invention, each of the upper illumination assemblies may further include a housing accommodating the first light source holder therein and having an opening through which different light irradiation zones, each of which includes at least two adjacent ones of the rows of light source arrays, are separated and exposed with the rotation of the first light source holder; and the first illumination sources arranged in the different light irradiation zones may have different light intensities.

According to an exemplary embodiment of the present invention, the lighting system may further include upper illumination rotating units, each of which includes a coupling shaft coupling the housing to an inner upper side of the casing and a rotary motor rotating the housing about the coupling shaft and rotates the corresponding upper illumination assembly to change the direction of light irradiated from the first illumination sources.

According to an exemplary embodiment of the present invention, the first light source holders may fix the rows of light source arrays in a one-to-one relationship, and each of the upper illumination assemblies may further include: a plurality of light source holder supports, each of which includes a cylinder and a reciprocating piston whose one end is inserted into one end of the cylinder and the other end is coupled to the corresponding first light source holder, whose length is variable depending on the length of the piston inserted; a first hinge shaft integrally connecting the other ends of the cylinders such that the plurality of light source holder supports are pivoted; second hinge shafts connecting the other ends of the pistons and the first light source holders in parallel with the first hinge shaft such that the first light source holders are pivoted; a light source holder support length adjusting unit controlling the reciprocal movement of the piston of each of the plurality of light source holder supports; a light source holder support pivoting unit pivoting the plurality of light source holder supports individually; and a light source holder pivoting unit pivoting the plurality of first light source holders individually.

According to an exemplary embodiment of the present invention, each of the upper illumination assemblies may further include a housing accommodating the light source holder supports and the first light source holders therein and having an opening through which different light irradiation zones, each of which includes at least two adjacent ones of the rows of light source arrays are separated and exposed with the rotation of the corresponding first light source holder; and the first illumination sources arranged in the different light irradiation zones may have different light intensities.

According to an exemplary embodiment of the present invention, the lighting system may further include upper illumination rotating units, each of which includes a coupling shaft coupling the housing to an inner upper side of the casing and a rotary motor rotating the housing about the coupling shaft, to change the direction of light irradiated from the first illumination sources.

An apparatus for foreign matter sorting according to an embodiment of the present invention includes: the lighting system for pellet analysis; a chute for transporting objects to be sorted including a plurality of pellets; an image sensor for analyzing light escaping from the casing through the through-hole formed at an upper side of the casing of the lighting system; and a compressed air spraying unit for spraying compressed air to allow the objects to float from the surface of the chute.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

Effects of the Invention

The lighting system of the present invention is designed in which a plurality of illumination devices are arrayed such that the arrays are convexly rounded toward objects to be sorted including a plurality of pellets and moving in one direction and irradiate illumination light in all directions, including upward, downward, left, and right directions, avoiding the appearance of shadows due to interactions between the objects and the illumination light.

In addition, all or some of the plurality of illumination devices have different light intensities and irradiate light in controlled directions. Therefore, control over the light intensities depending on the shape of objects to be sorted suppresses the appearance of shadows regardless of the shape of the objects.

BRIEF DESCRIPTION OF THE DRAWINGS

FIG. 1 is a cross-sectional view of a lighting system for pellet analysis according to a first embodiment of the present invention.

FIG. 2 is a bottom view as viewed toward the inner upper side of the casing illustrated in FIG. 1.

FIG. 3 is a perspective view of the upper illumination assembly illustrated in FIG. 1.

FIG. 4 is a cross-sectional view of a lighting system for pellet analysis according to a second embodiment of the present invention.

FIGS. 5 and 6 are cross-sectional views of a lighting system for pellet analysis according to a third embodiment of the present invention.

FIG. 7 is a cross-sectional view of an apparatus for foreign matter sorting according to an embodiment of the present invention.

BEST MODE FOR CARRYING OUT THE INVENTION

The objects, specific advantages, and novel features of the present invention will become apparent from the following detailed description and preferred embodiments in conjunction with the accompanying drawings. It should be noted that in the drawings, the same components are denoted by the same reference numerals even though they are depicted in different drawings. Although such terms as "first" and "second," etc. may be used to describe various components, these components should not be limited by above terms. These terms are used only to distinguish one component from another. In the description of the present invention, detailed explanations of related art are omitted when it is deemed that they may unnecessarily obscure the essence of the present invention.

Preferred embodiments of the present invention will now be described in detail with reference to the accompanying drawings.

FIG. 1 is a cross-sectional view of a lighting system for pellet analysis according to a first embodiment of the present invention, FIG. 2 is a bottom view as viewed toward the inner upper side of the casing illustrated in FIG. 1, and FIG. 3 is a perspective view of the upper illumination assembly illustrated in FIG. 1.

Referring to FIGS. 1 to 3, the lighting system includes: a casing 100 having an internal space, a through-hole 110 formed at an upper side thereof, and inner upper and lower portions between which objects (P) to be sorted including a plurality of pellets move; upper illumination assemblies 200, each of which includes a plurality of first illumination sources 210 irradiating first illumination light and a first light source holder 220 fixing the first illumination sources 210 onto an imaginary curved plane convexly rounded toward the objects (P) in a circular arc direction corresponding to the vertical direction with respect to the casing 100 such that rows of light source arrays, in which some of the plurality of first illumination sources 210 are arrayed along the lengthwise direction of the imaginary curved plane, are arrayed parallel to the circular arc direction of the imaginary curved plane, arranged in the inner upper portion of the casing 110 to irradiate the first illumination light toward upper and side portions of the objects (P); and lower illumination assemblies 300, each of which includes a plurality of second illumination sources 310 irradiating second illumination light and a second light source holder 320 fixing the plurality of second illumination sources 310, arranged in the inner lower portion of the casing 100 to irradiate the second illumination light toward lower and side portions of the objects (P).

The present invention is directed to a lighting system for pellet analysis and an apparatus for foreign matter sorting that are applied to technologies in which images of transparent and opaque pellets are acquired and the pellets are analyzed based on the images. Pellets are raw materials widely used in various fields such as films, pipes, and automotive interior materials. Even pellets produced by the same process are mixed with a number of pellets of other colors such as black, yellow, and red and pellets of other shapes such as long, twin, and snakeskin shapes. Thus, an apparatus for foreign matter sorting to sort normal pellets and abnormal foreign pellets was developed in which the pellets are imaged with a camera and a lighting system and are analyzed based on the images. However, the lighting system used in the conventional apparatus has a problem in that very various forms of shadows appear due to interactions between pellets and illumination light, making it impossible to distinguish actual foreign particles (pellets) and normal pellets only with images. The present invention has been devised to provide a solution to this problem.

As described above, the lighting system according to the first embodiment of the present invention includes a casing 100, upper illumination assemblies 200, and lower illumination assemblies 300.

The casing 100 is a box-shaped member accommodating the upper illumination assemblies 200 and the lower illumination assemblies 300 and has an internal space divided into an inner upper portion and an inner lower portion. The casing 100 may consist of an upper casing part forming the inner upper portion and a lower casing part forming the inner lower portion. The upper and lower casing parts may be physically separated from, hingedly coupled to or integrated with each other. The casing 100 has a through-hole 110 formed at an upper side thereof. The internal space of the casing 100 is in communication with the outside through the through-hole. Objects (P) to be sorted as analytes move between the inner upper and lower portions of the casing 100. An image sensor is arranged at a position corresponding to the through-hole 110 outside the casing to acquire images of the objects (P). The objects (P) are samples including a plurality of pellets and may be transported by a chute. The chute may be made of a light transmitting material.

The upper illumination assemblies 200 irradiate first illumination light toward upper and side portions of the objects (P). Each of the upper illumination assemblies 200 includes a plurality of first illumination sources 210 and a first light source holder 220.

Each of the plurality of first illumination sources 210 irradiates first illumination light. The first illumination sources may be, for example, LEDs, and are not necessarily limited thereto. Any light sources that can irradiate illumination light may be used without particular limitation as the first illumination sources.

The first light source holder 220 fixes the plurality of first illumination sources 210. The plurality of first illumination sources 210 are arranged on an imaginary curved plane by the first light source holder 220. The imaginary curved plane is convexly rounded toward the objects (P) in a circular arc direction corresponding to the vertical direction with respect to the casing. Some of the plurality of first illumination sources 210 are spaced apart from each other along the lengthwise direction of the imaginary curved plane, that is, the outer circumferential direction perpendicular to the circular arc direction, to form rows of light source arrays (PAn). The first illumination sources 210 are arranged such that the plurality of rows of light source arrays (PA1, PA2, . . . , and PAn) are arrayed in parallel with each other along the circular arc direction (see FIG. 3). The first illumination sources 210 in one (PA1) of the rows of light source arrays and the first illumination sources 210 in another one (PA2) of the rows of light source arrays have different light intensities. That is, the light intensities of the rows of light source arrays (PA1, PA2, . . . , and PAn) may be different from each other.

The first light source holder 220 is arranged in the inner upper portion of the casing 100 such that the plurality of first illumination sources 210 irradiate first illumination light toward the objects (P) downward obliquely. Accordingly, the first illumination light propagates toward upper and side portions of the objects (P).

The lower illumination assemblies 300 irradiate second illumination light toward lower and side portions of the objects (P). Each of the lower illumination assemblies 300 includes a plurality of second illumination sources 310 and a second light source holder 320.

Each of the plurality of second illumination sources 310 irradiates second illumination light. The second illumination sources may be, for example, LEDs, and are not necessarily limited thereto. Any light sources that can irradiate illumination light may be used without particular limitation as the second illumination sources.

The second light source holder 320 fixes the plurality of second illumination sources 310. The second light source holder 320 is arranged in the inner lower portion of the casing 100 such that the plurality of second illumination sources 310 irradiate second illumination light toward the objects (P) downward obliquely. Accordingly, the second illumination light propagates toward lower and side portions of the objects (P).

Referring to FIG. 2, the upper illumination assemblies 200 are provided in four. The upper illumination assemblies 200 are arranged at four sides of an imaginary rectangular ring centered on the through-hole 110. The lower illumination assemblies 300 are provided in four. The lower illumination assemblies 300 are arranged to face the upper illumination assemblies 200 diagonally in a one-to-one relationship.

The second illumination light from the lower illumination assemblies 300 is irradiated toward lower portions of the pellets upward obliquely. This irradiation can block the appearance of shadows in spaces between the pellets. In addition, the first illumination light irradiated downward obliquely in all directions from the plurality of first illumination sources 210 arranged on the imaginary curved plane reaches not only the side portions but also the lower portions of the pellets, which can suppress the appearance of shadows. The light intensities of the first illumination sources 210 and the second illumination sources 310 may also be differentiated uniformly or individually to control the appearance of shadows due to interactions between the pellets and the illumination light.

The coupling between the first illumination sources 210 and the first light source holder 220 can be implemented in various ways. For example, the first light source holder 220a of the upper illumination assembly 200a may include an illumination mounting plane 221 formed in a shape corresponding to the imaginary curved plane and the plurality of first illumination sources 210 may be arranged in parallel with each other on the illumination mounting plane 221 to configure the rows of light source arrays (PA1, PA2, . . . , and PAn), as illustrated in FIG. 3. The coupling between the first illumination sources 210 and the first light source holder 220 may be implemented in other ways, which will be described with reference to the following other embodiments.

FIG. 4 is a cross-sectional view of a lighting system for pellet analysis according to a second embodiment of the present invention. As illustrated in FIG. 4, the lighting system includes upper illumination assemblies 200b. Each of the upper illumination assemblies 200b includes a rotatable cylindrical first light source holder 220b.

The outer circumference of the cylindrical first light source holder 220b corresponds to the imaginary curved plane. The plurality of first light source holder 220b are arrayed in parallel with each other on the outer circumference of the cylindrical first light source holder 220b to configure a plurality of rows of light source arrays (RA). The cylindrical first light source holder 220b fixes the plurality of rows of light source arrays (RA).

The first light source holder 220b may rotate along a circular arc direction. The plurality of rows of light source arrays (RA) also rotate with the rotation of the first light source holder 220b. Depending on the rotation angle, a selection is made as to which of the first illumination sources 210 irradiate first illumination light. The selected first illumination sources 210 are located at positions where the first illumination light can be irradiated downward obliquely onto objects (P) to be sorted.

Each of the upper illumination assemblies 200a of the lighting system may further include a housing 290.

The housing 290 is a member accommodating the first light source holder 220b therein and has an opening 291 at a position facing the underlying objects (P) obliquely. Accordingly, the plurality of rows of light source arrays (RA) arranged on the outer circumference of the first light source holder 220b are surrounded by the inner surface of the housing 290 and the rotation of the first light source holder 220b exposes at least two adjacent ones of the rows of light source arrays (RA) to the outside through the opening 291. A collection of rows of light source arrays (RA) that can be exposed through the opening 291 is defined as a "light irradiation zone". That is, the plurality of rows of light source arrays (RA) are divided into a plurality of light irradiation zones (LZ1, LZ2). The light irradiation zone (LZ1) exposed through the opening 291 irradiates first illumination light. The first illumination sources 210 arranged in the different light irradiation zones (LZ1, LZ2) may have different light intensities. Accordingly, as the first light source holder 220b rotates, the different light irradiation zones (LZ1, LZ2) are exposed so that the first illumination sources 210 with different intensities can selectively irradiate light.

The lighting system may further include upper illumination rotating units 400, each of which rotates the corresponding upper illumination assembly 200b.

Each of the upper illumination rotating units includes a coupling shaft 410 and a rotary motor 430. The coupling shaft 410 is a shaft member that couples the housing 290 to an inner upper side of a casing 100. The coupling shaft 410 may be arranged perpendicular or oblique to a rotary shaft of the housing 290. The rotary motor 430 rotates the housing 290 about the coupling shaft 410. Accordingly, the rotation of the upper illumination assembly 200b by the upper illumination rotating unit 400 changes the direction of light irradiated from the first illumination sources 210.

FIGS. 5 and 6 are cross-sectional views of a lighting system for pellet analysis according to a third embodiment of the present invention.

Referring to FIGS. 5 and 6, the lighting system includes upper illumination assemblies 200c, each of which includes a plurality of first light source holders 220c. The plurality of first light source holders 220c can fix rows of light source arrays (RA) in a one-to-one relationship. The plurality of rows of light source arrays (RA) are arranged in parallel with each other. The first light source holders 220c are provided as many as the number of the rows of light source arrays (RA) such that each of the rows of light source arrays (RA) is coupled to the corresponding first light source holder 220c.

Each of the upper illumination assemblies 200c may further include a plurality of light source holder supports 230, a first hinge shaft 240, second hinge shafts 250, a light source holder support length adjusting unit 260, a light source holder support pivoting unit 270, and a light source holder pivoting unit 280.

Each of the plurality of light source holder supports 230 includes a cylinder 231 and a piston 233. One end of the piston 233 is inserted into one end of the cylinder 231. The piston 233 reciprocates in the cylinder 231. Accordingly, the length of the light source holder support 230 varies depending on the length of the piston 233 inserted. The other end of the piston 233 exposed outside the cylinder 231 is coupled to the corresponding first light source holder 220c. As a result, the plurality of rows of light source arrays (RA), the first light source holders 220c, and the light source holder supports 230 are coupled to one another one by one.

The first hinge shaft 240 penetrates the other ends of the cylinders 231 of the plurality of light source holder supports 230 to integrally connect the plurality of light source holder supports 230. This integral connection allows the plurality of light source holder supports 230 to pivot in the vertical direction with respect to a casing 100 around the first hinge shaft 240.

Each of the second hinge shafts 250 hingedly couples the other end of the piston 233 of the light source holder support 230 and the first light source holder 220c such that the first light source holder 220c is pivoted. The second hinge shafts 250 are arrayed in parallel with the first hinge shaft 240. With this array, the second hinge shafts 250 are pivoted in a plane identical to or facing the plane where the light source holder supports 230 are pivoted.

The light source holder support length adjusting unit 260 controls the lengths of the plurality of light source holder supports 230 individually. The light source holder support length adjusting unit 260 controls the reciprocal movement of the piston 233 of each of the light source holder supports 230 to adjust the length of the piston 233 inserted into the corresponding cylinder 231, with the result that the length of the light source holder support 230 is adjusted. For example, the light source holder support length adjusting unit 260 may control the amount and inflow position of a hydraulic fluid supplied to the cylinder 231 to adjust the length of the piston 233 inserted but is not necessarily limited to this function.

The light source holder support pivoting unit 270 pivots the plurality of light source holder supports 230 individually. For example, rotary devices such as motors may be individually mounted in the plurality of light source holder supports 230 and the light source holder support pivoting unit 270 may control the rotary devices to rotate the light source holder supports 230. However, the light source holder support pivoting unit 270 is not necessarily limited to this function as long as it can pivot the plurality of light source holder supports 230 individually.

The light source holder pivoting unit 280 pivots the plurality of first light source holders 220c individually. For example, rotary devices such as motors may be individually mounted in the plurality of first light source holders 220c and the light source holder pivoting unit 280 may control the rotary devices to rotate the first light source holders 220c. However, the light source holder pivoting unit 280 is not necessarily limited to this function as long as it can pivot the plurality of first light source holders 220c individually.

Each of the upper illumination assemblies 200c of the lighting system may further include a housing 290. The housing 290 accommodates the plurality of first light source holders 220c and the light source holder supports 230 therein and has an opening 291 at a position facing underlying objects (P) to be sorted obliquely. Accordingly, the plurality of rows of light source arrays (RA) are surrounded by the inner surface of the housing 290 and the rotation of at least two ones of the plurality of light source holder supports 230 exposes at least two adjacent ones of the rows of light source arrays (RA) connected to the rotating light source holder supports 230 to the outside through the opening 291. A collection of rows of light source arrays (RA) that can be exposed through the opening 291 is defined as a "light irradiation zone". That is, the plurality of rows of light source arrays (RA) are divided into a plurality of light irradiation zones (LZ1, LZ2). The light irradiation zone (LZ1) exposed through the opening 291 irradiates first illumination light. The first illumination sources 210 arranged in the different light irradiation zones (LZ1, LZ2) may have different light intensities. Accordingly, as the light source holder supports 230 rotates, the different light irradiation zones (LZ1, LZ2) are exposed so that the first illumination sources 210 with different light intensities can selectively irradiate light. Since the first light source holders 220c are also pivoted individually in the light irradiation zones (LZ1, LZ2), the rows of light source arrays (RA) exposed through the opening 291 are moved when the light source holder supports 230 are pivoted, enabling control over the direction of the first illumination light.

The lighting system may further include upper illumination rotating units 400, each of which rotates the corresponding upper illumination assembly 200c.

Each of the upper illumination rotating units 400 may include a coupling shaft 410 and a rotary motor 430. The coupling shaft 410 is a shaft member that couples the housing 290 to an inner upper side of the casing 100. The coupling shaft 410 may be arranged perpendicular or oblique to a rotary shaft of the housing 290. The rotary motor 430 rotates the housing 290 about the coupling shaft 410. Accordingly, the rotation of the upper illumination assembly 200c by the upper illumination rotating unit 400 changes the direction of light irradiated from the first illumination sources 210 to a direction perpendicular to the pivoting direction of the light source holder supports 230.

A description will be given of an apparatus for foreign matter sorting to which any of the lighting systems for pellet analysis according to the first to third embodiments of the present invention is applied. The lighting systems for pellet analysis have been described above and a repeated explanation is omitted or simplified.

FIG. 7 is a cross-sectional view of an apparatus for foreign matter sorting according to an embodiment of the present invention. With reference to this figure, the apparatus includes a lighting system 1000 for pellet analysis, a chute 2000, an image sensor 3000, and a compressed air spraying unit 4000.

The lighting system 1000 is any of the lighting systems according to the first to third embodiments of the present invention. That is, the lighting system 1000 is designed in which the upper illumination assemblies 200, 200a, 200b or 200c are arranged in the inner upper portion of the casing 100 to irradiate first illumination light downward obliquely and the lower illumination assemblies 300 are arranged in the inner lower portion of the casing 100 to irradiate second illumination light upward obliquely.

The chute 2000 is a moving means for moving objects (P) to be sorted including a plurality of pellets. The chute 2000 is arranged in the casing 100 to move the objects (P) between the inner upper and lower portions of the casing 100. The objects (P) pass through a zone irradiated with the first illumination light and the second illumination light. The chute 2000 may be made of a material through which the second illumination light can pass.

The image sensor 3000 images the objects (P) under the first illumination light and the second illumination light through the through-hole 110 formed at an upper side of the casing 100. The image sensor 3000 may be a CCD sensor but is not necessarily limited thereto.

The compressed air spraying unit 4000 is a device for spraying compressed air upward from the bottom of the chute 2000. Air nozzles 2100 are disposed so as to penetrate from the bottom to the top of the chute. Compressed air flows upward through the air nozzles 2100 to allow the objects (P) moving along the upper surface of the chute 2000 to float from the surface of the chute 2000. At this time, the first illumination light and the second illumination light can reach the lower portions of the objects (P), which enables analysis of the pellets while suppressing the appearance of shadows.

Overall, the lighting system of the present invention is designed in which a plurality of illumination devices are arrayed such that the arrays are convexly rounded toward objects (P) to be sorted including a plurality of pellets and moving in one direction and irradiate illumination light in all directions, including upward, downward, left, and right directions, avoiding the appearance of shadows due to interactions between the objects (P) and the illumination light. In addition, all or some of the plurality of illumination devices have different light intensities and irradiate light in controlled directions. Therefore, control over the light intensities depending on the shape of objects (P) to be sorted suppresses the appearance of shadows regardless of the shape of the objects (P).

Although the present invention has been described herein with reference to the foregoing specific embodiments, these embodiments do not serve to limit the invention and are set forth for illustrative purposes. It will be apparent to those skilled in the art that modifications and improvements can be made without departing from the spirit and scope of the invention.

Simple modifications and changes of the present invention belong to the scope of the present invention and the specific scope of the present invention will be clearly defined by the appended claims.

| [Explanation of Reference Numerals] | |
|---|---|
| 100: Casing | 110: Through-hole |
| 200: Upper illumination assembly | |
| 210: First illumination source | 220: First light source holder |
| 221: Illumination mounting plane | |
| 230: Light source holder support | |
| 231: Cylinder | 233: Piston |
| 240: First hinge shaft | 250: Second hinge shaft |
| 260: Light source holder support length adjusting unit | |
| 270: Light source holder support pivoting unit | |
| 280: Light source holder pivoting unit | |
| 290: Housing | 291: Opening |
| 300: Lower illumination assembly | |
| 310: Second illumination source | |
| 320: Second light source holder | 400: Upper illumination rotating unit |
| 410: Coupling shaft | 430: Rotary motor |
| 1000: Lighting system for pellet analysis | |
| 2000: Chute | 3000: Image sensor |
| 4000: Compressed air spraying unit | |
| P: Object to be sorted | |

INDUSTRIAL APPLICABILITY

The lighting system of the present invention is designed in which a plurality of illumination devices are arrayed such that the arrays are convexly rounded toward objects to be sorted including a plurality of pellets and moving in one direction and irradiate illumination light in all directions, including upward, downward, left, and right directions, avoiding the appearance of shadows due to interactions between the objects and the illumination light. In addition, all or some of the plurality of illumination devices have different light intensities and irradiate light in controlled directions. Therefore, control over the light intensities depending on the shape of objects to be sorted suppresses the appearance of shadows regardless of the shape of the objects. Therefore, the lighting system of the present invention is suitable for industrial applications, including foreign matter sorting and analysis.

The invention claimed is:

1. A lighting system for pellet analysis, comprising: a casing having an internal space, a through-hole formed at an upper side thereof, and inner upper and lower portions between which objects to be sorted comprising a plurality of pellets move; upper illumination assemblies, each of which comprises a plurality of first illumination sources irradiating first illumination light and a first light source holder fixing the first illumination sources onto an imaginary curved plane convexly rounded toward the objects in a circular arc direction corresponding to the vertical direction with respect to the casing such that rows of light source arrays, in which some of the plurality of first illumination sources are arrayed along the lengthwise direction of the imaginary curved plane, are arrayed parallel to the circular arc direction of the imaginary curved plane, arranged in the inner upper portion of the casing to irradiate the first illumination light toward upper and side portions of the objects; and lower illumination assemblies, each of which comprises a plurality of second illumination sources irradiating second illumination light and a second light source holder fixing the plurality of second illumination sources, arranged in the inner lower portion of the casing to irradiate the second illumination light toward lower and side portions of the objects.

2. The lighting system according to claim 1, wherein the upper illumination assemblies are arranged at the sides of an imaginary rectangular ring centered on the through-hole and the lower illumination assemblies are arranged to face the upper illumination assemblies diagonally.

3. The lighting system according to claim 1, wherein each of the first light source holders is disposed in a shape corresponding to the imaginary curved plane and has an illumination mounting plane to which the plurality of first illumination sources are fixed.

4. The lighting system according to claim 1, wherein each of the first light source holders is disposed in a cylindrical shape whose outer circumference corresponds to the imaginary curved plane and rotates along the circular arc direction, and the plurality of first illumination sources are fixed to the outer circumference.

5. The lighting system according to claim 4, wherein each of the upper illumination assemblies further comprises a housing accommodating the first light source holder therein and having an opening through which different light irradiation zones, each of which comprises at least two adjacent ones of the rows of light source arrays, are separated and exposed with the rotation of the first light source holder; and the first illumination sources arranged in the different light irradiation zones have different light intensities.

6. The lighting system according to claim 5, further comprising upper illumination rotating units, each of which comprises a coupling shaft coupling the housing to an inner upper side of the casing and a rotary motor rotating the housing about the coupling shaft and rotates the corresponding upper illumination assembly to change the direction of light irradiated from the first illumination sources.

7. The lighting system according to claim 1, wherein the first light source holders fix the rows of light source arrays in a one-to-one relationship, and each of the upper illumination assemblies further comprises: a plurality of light source holder supports, each of which comprises a cylinder and a reciprocating piston whose one end is inserted into one end of the cylinder and the other end is coupled to the corresponding first light source holder, whose length is variable depending on the length of the piston inserted; a first hinge shaft integrally connecting the other ends of the cylinders such that the plurality of light source holder supports are pivoted; second hinge shafts connecting the other ends of the pistons and the first light source holders in parallel with the first hinge shaft such that the first light source holders are pivoted; a light source holder support length adjusting unit controlling the reciprocal movement of the piston of each of the plurality of light source holder supports; a light source holder support pivoting unit pivoting the plurality of light source holder supports individually; and a light source holder pivoting unit pivoting the plurality of first light source holders individually.

8. The lighting system according to claim 7, wherein each of the upper illumination assemblies further comprises a housing accommodating the light source holder supports and the first light source holders therein and having an opening through which different light irradiation zones, each of which comprises at least two adjacent ones of the rows of light source arrays are separated and exposed with the rotation of the corresponding first light source holder; and the first illumination sources arranged in the different light irradiation zones have different light intensities.

9. The lighting system according to claim 8, further comprising upper illumination rotating units, each of which comprises a coupling shaft coupling the housing to an inner upper side of the casing and a rotary motor rotating the housing about the coupling shaft, to change the direction of light irradiated from the first illumination sources.

10. An apparatus for foreign matter sorting, comprising: the lighting system according to claim 1; a chute for transporting objects to be sorted comprising a plurality of pellets; an image sensor for analyzing light escaping from the casing through the through-hole formed at an upper side of the casing of the lighting system; and a compressed air spraying unit for spraying compressed air to allow the objects to float from the surface of the chute.

\* \* \* \* \*